United States Patent
Garvey et al.

(10) Patent No.: US 7,266,596 B2
(45) Date of Patent: Sep. 4, 2007

(54) DYNAMIC STORAGE SPACE LINKING

(75) Inventors: Russel Roy Garvey, Mantorville, MN (US); Thomas Leo Haze, Rochester, MN (US); Anthony Martin Mueller, Rochester, MN (US); Andrew Thomas Tauferner, Rochester, MN (US); Tanveer Zubair, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1188 days.

(21) Appl. No.: 09/837,389

(22) Filed: Apr. 18, 2001

(65) Prior Publication Data

US 2002/0165946 A1 Nov. 7, 2002

(51) Int. Cl.
G06F 15/173 (2006.01)
G06F 15/16 (2006.01)
(52) U.S. Cl. ..................... 709/223; 709/208
(58) Field of Classification Search ............... 709/222, 709/202, 221, 223, 229
See application file for complete search history.

(56) References Cited

U.S. PATENT DOCUMENTS

| | | | | |
|---|---|---|---|---|
| 5,461,721 A | * | 10/1995 | Cormier et al. ............... 711/2 |
| 5,495,611 A | * | 2/1996 | Bealkowski et al. ........... 713/2 |
| 5,515,510 A | * | 5/1996 | Kikinis ....................... 709/203 |
| 5,554,863 A | * | 9/1996 | Kouzuchi et al. ............ 257/138 |
| 5,754,863 A | * | 5/1998 | Reuter ......................... 717/173 |
| 5,826,035 A | * | 10/1998 | Hamada et al. .............. 709/247 |
| 5,828,887 A | * | 10/1998 | Yeager et al. ................ 717/167 |
| 5,999,930 A | * | 12/1999 | Wolff ............................ 707/8 |
| 6,020,889 A | * | 2/2000 | Tarbox et al. ................ 345/736 |
| 6,105,027 A | * | 8/2000 | Schneider et al. ............. 707/9 |
| 6,212,559 B1 | * | 4/2001 | Bixler et al. ................. 709/221 |
| 6,665,714 B1 | * | 12/2003 | Blumenau et al. .......... 709/222 |
| 6,850,253 B1 | * | 2/2005 | Bazerman et al. .......... 715/734 |
| 6,976,145 B1 | * | 12/2005 | Bradford ..................... 711/170 |
| 2002/0152295 A1 | * | 10/2002 | Crowley et al. ............. 709/223 |
| 2007/0078961 A1 | * | 4/2007 | Kumano et al. ............. 709/223 |

* cited by examiner

*Primary Examiner*—Ario Etienne
*Assistant Examiner*—Sargon N Nano
(74) *Attorney, Agent, or Firm*—Patterson & Sheridan, LLP

(57) ABSTRACT

A method for adding storage space to a server without powering down the server is provided. One embodiment provides a method for dynamically linking a storage space to a network server, comprising: adding a new disk drive image to a network server description for the network server through a host server operating system, the new disk drive image corresponding to the storage space to be linked; sending a dynamic linking request from the host server operating system to a network server operating system; in response to the dynamic linking request, sending a device scanning request from the network server operating system to the host operating system; in response to the device scanning request, requesting response from each device connected to each SCSI port of a host server and reporting the new disk drive image to the network server operating system; and presenting the new disk drive image to users connected to the network server.

15 Claims, 4 Drawing Sheets

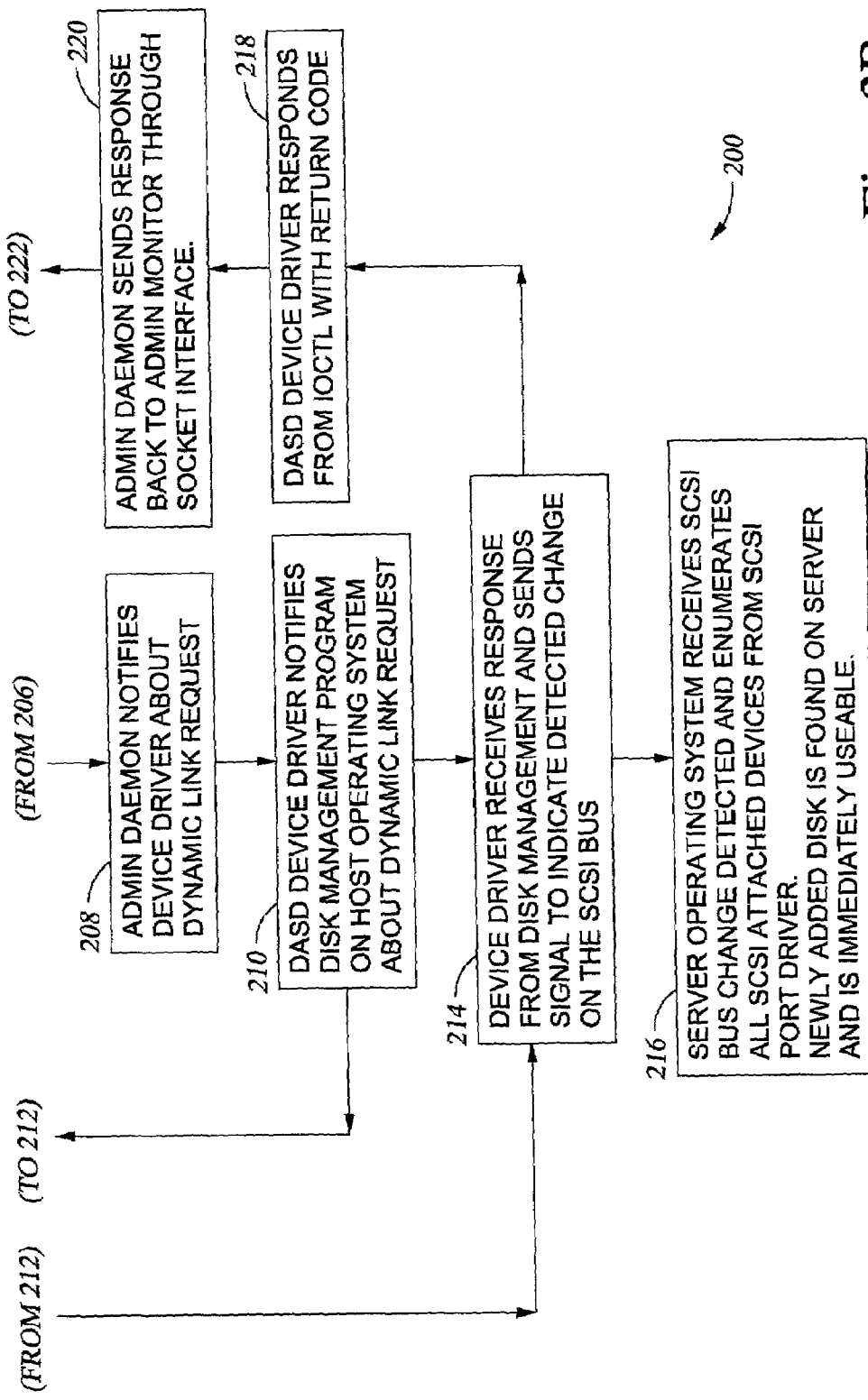

DYNAMIC STORAGE SPACE LINKING

BACKGROUND OF THE INVENTION

1. Field of the Invention

The present invention generally relates to methods of adding storage space to a server. More particularly, the invention relates to dynamically linking storage space to a server without powering down the server.

2. Description of the Related Art

Dynamic storage space linking is the ability to add additional disk drive images corresponding to the additional storage space to one or more active servers and link the disk drive images to the one or more active servers without powering down the servers. Presently, to add storage space to a server in a client/server system, the server is required to be powered down before the storage space can be added to the server. In a typical process for adding storage space, the storage space is created as an additional disk drive image in a server description, and then the disk drive image is linked to the server while the server is powered down. When the server is powered back up, the initial server loading program performs the tasks required to complete the link between the server and the disk drive image, and the newly linked disk drive image becomes available to clients connected to the server once the server becomes active.

However, many systems require the server to be available at all times, and powering down an active server for installation of a new storage space is undesirable. One current solution to add disks to an active server utilizes a special bus and devices attached to a server through the special bus. USB (Universal Serial Bus) and IEEE 1394 (Institute of Electrical and Electronics Engineers standard 1394) are two bus types that support hot pluggable devices. However, devices designed for connection to USB or IEEE 1394 buses are typically not designed to be used as a server's disk drive or storage space. Disks attached to a server are typically connected through a SCSI (Small Computer System Interface), and SCSI devices are usually not hot pluggable devices.

Another solution for adding disks to an active server requires special hardware. For example, a SCSI disk drive may be added to a special hardware disk bay, such as a RAID (Redundant Array of Independent Disks) tower, while the server is active. However, the special hardware requires additional cost and may also require special knowledge during initial installation of the special hardware.

Therefore, a need exists for a method for adding storage space to a server without powering down the server. It is desirable for the storage space to be added without requiring installation of special hardware or physically installing additional storage devices to the server. It is further desired for the method to be simple to perform and fast in execution.

SUMMARY OF THE INVENTION

A method for adding storage space to a server without powering down the server is provided. The method provides for the storage space to be added without requiring installation of special hardware or physically installing additional storage devices to the server, and the method is simple to perform and fast in execution.

One embodiment provides a method for dynamically linking a storage space to a network server, comprising: adding a new disk drive image to a network server description for the network server through a host server operating system, the new disk drive image corresponding to the storage space to be linked; sending a dynamic linking request from the host server operating system to a network server operating system; in response to the dynamic linking request, sending a device scanning request from the network server operating system to the host server operating system; in response to the device scanning request, requesting response from each device connected to each SCSI port of a host server and reporting the new disk drive image to the network server operating system; and presenting the new disk drive image to users connected to the network server.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1A:
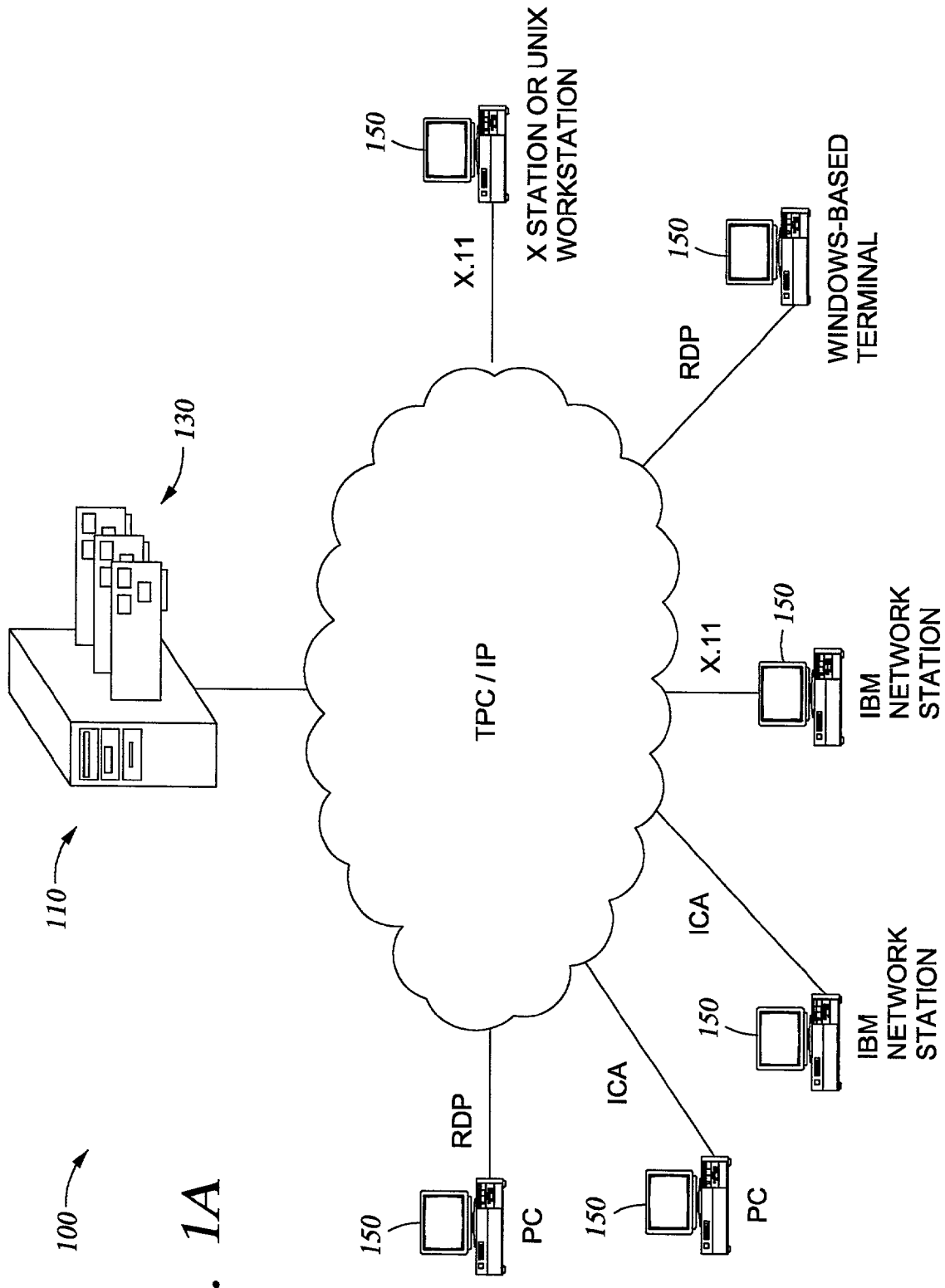
FIG. 1 is a schematic diagram illustrating a client/server system having a host server and a plurality of network servers.
Figure 1B:
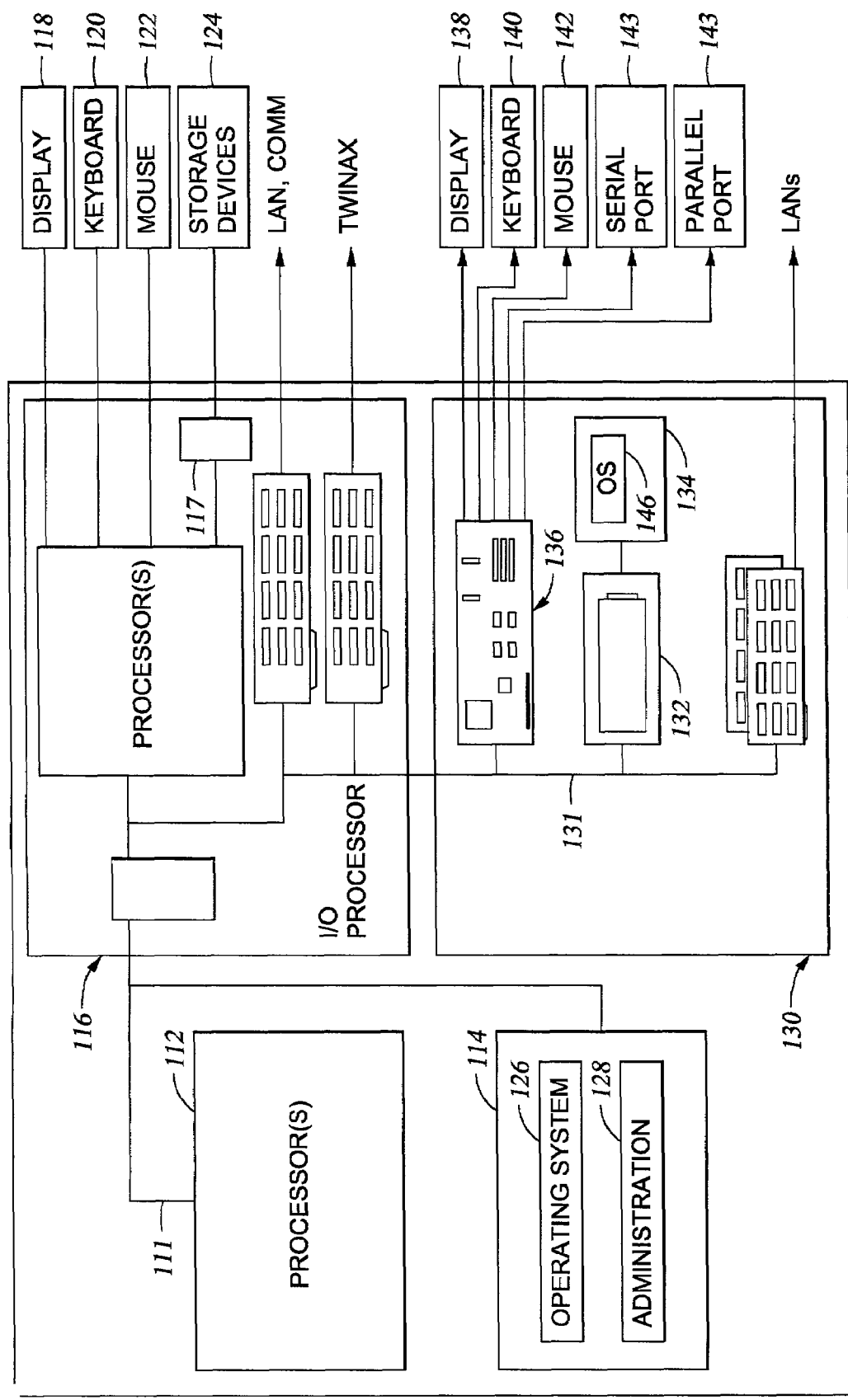

FIG. 1 is a schematic diagram illustrating a client/server system having a host server and a plurality of network servers. The client/server system 100 includes a host server 110 and one or more network servers 130 disposed in connection with the host server 110. A plurality of clients 150 (e.g., client computers and network stations) may be connect to the host server 110 and/or the network servers 130 through local area networks, wide area networks, and remote access connections. The clients 150 may communicate through TCP/IP (Transfer Control Protocol/Internet Protocol) with the servers 110, 130.

The one or more network servers 130 may comprise one or more integrated servers built on a PCI (Peripheral Component Interconnect) or SPD (System Product Division) card that can be installed onto PCI or SPD slots of the host server. The network servers 130 may be housed in the same housing as the host server. Alternatively, network servers 130 may be housed in one or more separate housings. The host server 110 and the network servers 130 are connected and communicate through an internal LAN (local area network) connection (e.g., a PCI bus).

The host server 110 includes one or more processors 112, memory 114, an I/O (input/output) processor 116, and a system bus 111 connecting these components. Input/output devices such as a display monitor 118, a keyboard 120, and a pointing device 122 (e.g., mouse) are connected to the host server 110 through the I/O processor 116. One or more storage devices 124, such as direct access storage device (DASD), tape storage devices, CD-ROM (compact disc read only memory), and other optical or magnetic storage devices, may be connected to the host server 110 through SCSI bus/ports 117 connected to the I/O processor 116. Data files, software programs, and other information may be stored on the storage devices 124. One or more software programs, such as a host server operating system 126 (e.g., IBM OS/400) and a host server administration software program 128, may be stored in memory 114 or alternatively, in the storage devices 124. Operation of the host server operating system 126 and the host server 110 may be controlled by user input through I/O devices such as the keyboard 120 and the pointing device 122.

The network server 130 includes one or more processors 132, memory 134, a bridge/support logic 136 and one or more LAN cards 148. These components of the network server are connected to a PCI bus 131, which connects the network server to the I/O processor 116 of the host server 110. Input/output devices such as a display monitor 138, a keyboard 140, and a pointing device 142 (e.g., mouse) are connected to the network server 130 through the bridge/support logic 136. Additional I/O ports 143 may include one or more serial ports and parallel ports. One or more software programs, such as a network server operating system 146 (e.g., Windows 2000 and Windows NT server operating systems) may be stored in memory 134. Operation of the network server operating system 146 and the network server 130 may be controlled by user input through I/O devices such as the keyboard 140 and the pointing device 142.

The network server operating system described herein refers to any server operating system that can use a software disk drive image that appears to the network server as a physical disk drive. For example, the IBM Integrated xSeries server for iSeries supports such software disk drive image when running a server operating system such as Windows 2000. The disk drives in such exemplar environment are actually IFS (Integated File System) files that are presented to the Windows server as disk drives. Disk drive images appear to the network server operating system as a disk drive with the help of a disk driver and lower layer processes (e.g., SLIC or System Licensed Internal Code through a TIMI or Technology Independent Machine Interface) that can read from the file similar to a normal disk driver that can read from a hard disk. The disk drive image is partitioned, formatted, and supports all the normal disk drive requests that the network server operating system expects.

A commercial example of a client/server system having a host server and a plurality of network servers is the IBM iSeries server (host) with the IBM xSeries integrated servers. Although embodiments of the invention are described utilizing commands for the IBM OS/400® operating system running on IBM iSeries server and in connection with the IBM xSeries integrated servers running a Windows® 2000 server operating system, it is understood that other embodiments may be practiced on other server systems and other operating systems.

Figure 2A:
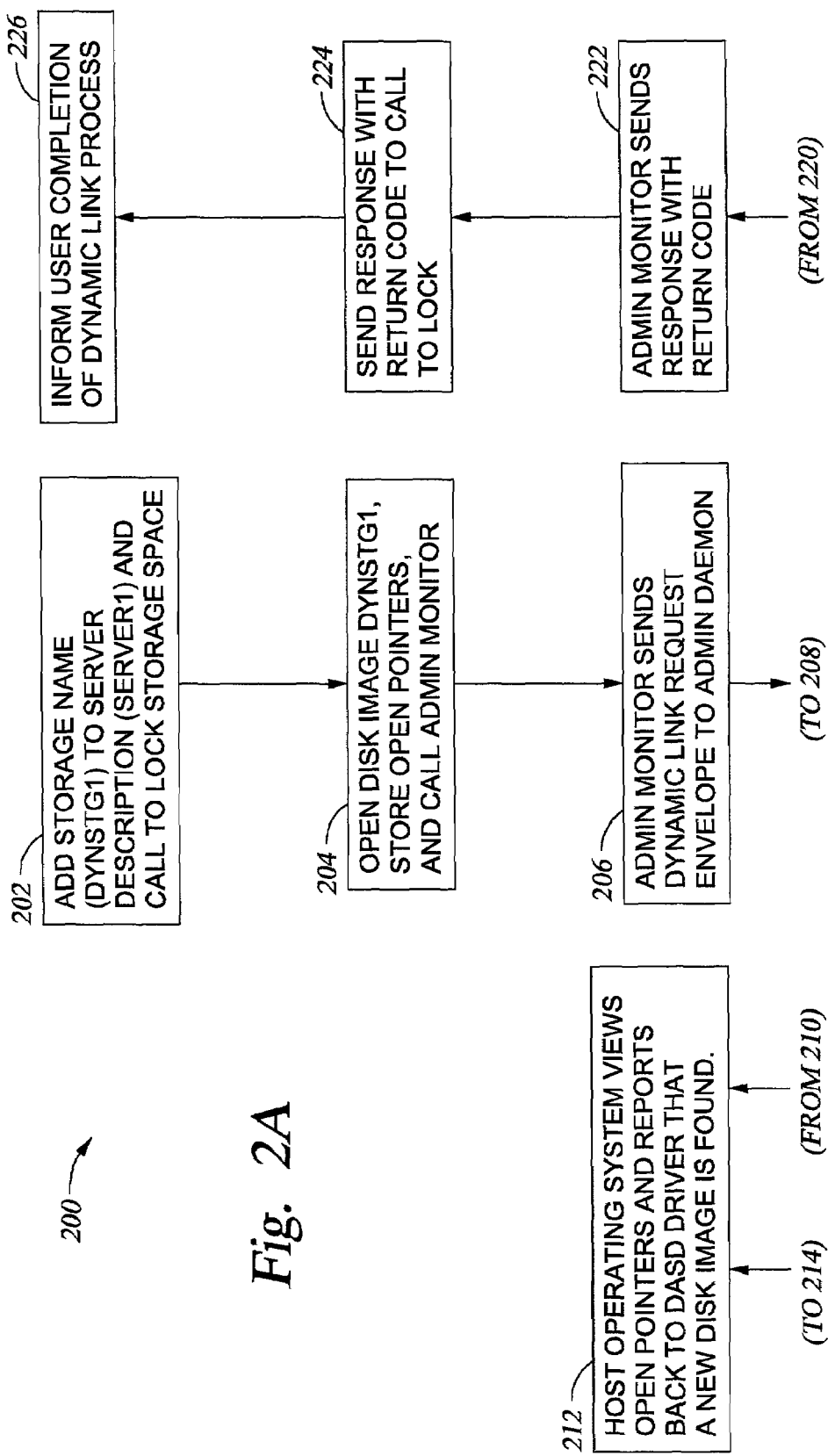
FIG. 2 is a flow chart illustrating one embodiment of a method for dynamically linking storage space.

FIG. 2 is a flow chart illustrating one embodiment of a method for dynamically linking storage space. In one embodiment, the processes performed on or by the host server operating system is shown in FIG. 2A, and the processes performed on or by the network server operating system is shown in FIG. 2B. Prior to linking a storage space, a disk drive image representing the storage space is created on the host server. The storage space may include existing data which may be utilized immediately after the dynamic linking process. In one embodiment, the disk drive image is created as a file which is equivalent in size as the amount of space required for the storage space to be added. For example, if an additional 2 gigabytes of disk space is required for the server, then a 2 gigabyte file is created for the disk drive image. The data that is stored in the file is the information the host server operating system will recognize as the master boot record of the disk. As an example, the disk drive image may be created on an IBM iSeries server running OS/400 using a command called "create network server storage" (CRTNWSSTG). A name (e.g., DYNSTG1) is given to the disk drive image which is used to manage the disk drive image in the dynamic linking process 200 described below. The disk drive image creation step is not considered part of the dynamic link process, but is required for the existence of a disk drive image.

The dynamic linking process 200 begins at step 202 in which the newly created disk drive image (e.g., DYNSTG1) is added to the server description at the network server operating system's list of allocated disk drive images. For each network server running in this environment, a list is stored in a server description which keeps track of various items including the disk drives being used by the respective network server. This list contains the names of the disk drives allocated to the respective server in the same order that is required for the respective server to boot properly. The first disk in the list is the bootable image, followed by any additional disks required for the server. The server description (e.g., SERVER1) which is used on the IBM iSeries server is known as Network Server Description (NWSD). The command used to add the new disk drive image to the server description on the IBM iSeries server is the "add network server storage link" (ADDNWSSTGL) command. By specifying both the server name and the disk drive image name on the command, the new disk drive image name gets stored in the server description list of disk drive images.

After the new disk drive image name is stored in the server description, a process to lock that storage space for use of the server is performed at step 204. To lock the storage space for use of the server, the network server description file is opened, and the open pointers that are used in lower level code to get direct access to the data held inside the disk drive image are stored into a different area of the network server description. After the open pointers are stored in the network server description, a program call is performed with a specific parameter to inform an ADMIN MONITOR JOB program on the host server that a dynamic storage link process is being performed.

The ADMIN MONITOR JOB is a program that runs on the host server operating system and is used for integration between the host server operating system and a network server (e.g., an integrated server) operating system. The ADMIN MONITOR JOB performs many functions including, but not limited to, time synchronization, power up and power down management, user profile synchronization, sending remote commands, and retrieving server statistics. Some functions performed by the ADMIN MONITOR JOB may be executed by the ADMIN DAEMON program running on the network server operating system.

The ADMIN DAEMON is a program which continually runs on the network server operating system and waits for requested tasks. When the ADMIN DAEMON receives a request from the ADMIN MONITOR JOB, the ADMIN DAEMON performs the requested task and responds back with the results when the task is completed. The ADMIN MONITOR JOB and the ADMIN DAEMON communicate through a TCP/IP socket interface.

The ADMIN MONITOR JOB receives notification that a dynamic link request is being performed and builds a dynamic link request envelope to be sent to the ADMIN DAEMON program running on the network server operating system (step 206). The ADMIN MONITOR JOB may send the dynamic link request envelope through a socket interface on a TCP/IP LAN connection. The dynamic link request envelope states that a dynamic link request is being performed and that a rescan of the SCSI bus on the host server needs to be performed. After the ADMIN MONITOR JOB sends the envelope packet, an event timer is set on the host operating system which waits for a response back from the ADMIN DAEMON on the network server system.

After the ADMIN DAEMON receives notification of the dynamic link request from the admin monitor job, the ADMIN DAEMON informs the network server's DASD (Direct Access Storage Device) device driver that the SCSI bus needs to be rescanned to find the additional storage space corresponding to the new disk drive image (step 208). For the IBM integrated xSeries server running Windows® 2000, this is done using provided APIs (Application Program Interface) to signal the disk driver and passing a defined IOCTL (Input/Output Control code) which informs the disk driver to rescan the SCSI bus.

The DASD device driver receives notification of rescan request via the IOCTL and verifies that the rescan request is valid. The DASD device driver then sends a request (e.g., a call) to the disk management program on the host server operating system (step 210). The disk management program is the code which manages the open disk image files on the host operating system. The disk management program on the host server is requested to re-scan the SCSI bus.

In response to the call from the DASD device driver, the disk management program on the host server operating system views the list of open disk drive image pointers stored in the network server description and reports back to the DASD device driver that a new disk drive is available (step 212). The DASD device driver receives notification that the new disk drive (i.e., the storage space represented by the new disk drive image) is available, and then the DASD device driver informs the network server operating system that a change occurred on the affected SCSI bus (step 214).

In response to the detected change on the SCSI bus, the network server operating system requests response from each device connected to each SCSI port (step 216). During this step, the network server operating system detects the new disk drive image as a newly added disk drive and presents the new disk drive image to users of the server that a new disk is available. The newly added storage space becomes immediately useable.

The following steps describe responses for completing the dynamic linking process 200. Once the network server operating system has been informed that a change was detected on the SCSI bus at the completion of step 214, the DASD device driver sends a response (e.g., a return code) to the IOCTL that was sent by the ADMIN DAEMON to inform the ADMIN DAEMON that the rescan of the SCSI bus has been completed (step 218). At step 220, the ADMIN DAEMON sends a response packet through the TCP/IP socket to the ADMIN MONITOR JOB with the status of the dynamic link and completion of the requested tasks. At step 222, the ADMIN MONITOR JOB responds to the program call from step 204 with a return code to inform the completion status of the dynamic link. At step 224, the process call to lock the storage space returns a response to the "add network server storage link" (ADDNWSSTGL) command with a return code to inform the completion status of the dynamic link. At step 226, the "add network server storage link" (ADDNWSSTGL) command informs the user that the dynamic link process has completed.

While the foregoing is directed to embodiments of the present invention, other and further embodiments of the invention may be devised without departing from the basic scope thereof, and the scope thereof is determined by the claims that follow.

The invention claimed is:

1. A method for dynamically linking a storage space to a network server, comprising:
    adding a new disk drive image to a network server description for the network server through a host server operating system, the new disk drive image corresponding to the storage space to be linked;
    sending a dynamic linking request from the host server operating system to a network server operating system;
    in response to the dynamic linking request, sending a device scanning request from the network server operating system to the host server operating system;
    in response to the device scanning request, requesting a response from each device connected to each SCSI part of a host server and reporting the new disk drive image to the network server operating system; and
    presenting the new disk drive image to users connected to the network server.

2. The method of claim 1, further comprising:
    locking the new disk drive image and storing open pointers of the storage space prior to sending the dynamic linking request.

3. The method of claim 1 wherein the storage space resides on a storage device connected to a SCSI port of a host server.

4. The method of claim 1 wherein the device scanning request is sent from a device driver of the network sewer operating system to the host server operating system.

5. The method of claim 4 wherein a disk management program on the host server operating system requests response from each device connected to each SCSI port of a host server and reports the new disk drive image to device driver of the network server operating system.

6. The method of claim 1 wherein the storage space includes existing data.

7. A method for linking a storage space to an active server, comprising:
    adding a new disk drive image to a server description for the server, the new disk drive image corresponding to the storage space to be linked;
    detecting changes on a SCSI bus indicating the new disk drive image corresponding to the storage space, wherein detecting changes on the SCSI bus comprises:
    sending a device scanning request from a device driver of a server operating system;
    in response to the device scanning request, requesting a response from each device connected to each SCSI port of the server; and
    reporting the new disk drive image to the device driver; and presenting the new disk drive image to users connected to the server.

8. The method of claim 7, further comprising:
    after adding the new disk drive image, locking the new disk drive image and storing open pointers of the storage space.

9. The method of claim 7 wherein the storage space includes existing data.

10. A method for linking a storage space to an active network server, comprising:
    adding a new disk drive image to a network server description for the network server through a host server operating system, the new disk drive image corresponding to the storage space to be linked, the storage space residing on a storage device connected to a SCSI part of a host server;

locking the new disk drive image and storing open pointers of the storage space;

sending a linking request from the host server operating system to a network server operating system;

in response to the linking request, sending a device scanning request from a device driver of the network server operating system to a disk management program of the host server operating system;

in response to the device scanning request, detecting changes on a SCSI bus of the host server, requesting a response from each device connected to each SCSI port of the host server and reporting the new disk drive image to the disk driver of the network server operating system; and presenting the new disk drive image to users connected to the network server.

11. The method of claim 10 wherein a disk management program on the host server operating system responds to the device scanning request.

12. The method of claim 10 wherein the storage space includes existing data.

13. The method of claim 1, wherein the new disk drive image is created as a file which is equivalent in size to the storage space to be linked.

14. The method of claim 7, wherein the new disk drive image is created as a file which is equivalent in size to the storage space to be linked.

15. The method of claim 10, wherein the new disk drive image is created as a file which is equivalent in size to the storage space to be linked.

* * * * *